June 21, 1966     D. W. ROWELL     3,256,729

METHOD AND APPARATUS FOR EXTRUSION WITH MULTIPLE CONTAINERS

Filed Aug. 26, 1964     2 Sheets-Sheet 1

INVENTOR.
DOUGLAS W. ROWELL

ATTORNEYS

June 21, 1966   D. W. ROWELL   3,256,729
METHOD AND APPARATUS FOR EXTRUSION WITH MULTIPLE CONTAINERS
Filed Aug. 26, 1964   2 Sheets-Sheet 2

INVENTOR.
DOUGLAS W. ROWELL

ATTORNEYS 3,256,729
METHOD AND APPARATUS FOR EXTRUSION
WITH MULTIPLE CONTAINERS
Douglas W. Rowell, Woodbury, Conn., assignor to The
Anaconda American Brass Company, a corporation of
Connecticut
Filed Aug. 26, 1964, Ser. No. 392,158
5 Claims. (Cl. 72—263)

This invention relates to a system for successively extruding billets through an extrusion press and more particularly it relates to the method and apparatus for extruding billets in which loaded containers are successively charged into an extrusion press for extrusion.

In the extrusion of metals, blocks of solid metal are converted into continuous or broken lengths of uniform cross section by forcing the metal under pressure through an orifice defined by a die. The metal is usually preheated, although in some instances the extrusion is made while the metal is cold, and the metal is usually in the form of a cylindrical billet, either solid or hollow. A solid billet is generally formed by casting and cutting to size, while the hollow billet may be cast, mechanically drilled, or obtained by the piercing of a solid billet. A billet, and usually a dummy block are positioned within a strong enclosure known as the container, and a cylindrical ram, actuated hydraulically or mechanically exerts the necessary pressure to effect extrusion. In direct or forward extrusion, the die is also positioned within the container and is located at the end of the container opposite the ram; and in backward extrusion the die is placed on the end of the ram.

In the operation of an extrusion press, the output of the press is generally determined by the number of pounds per hour which can be extruded by the press. Since in the standard extrusion press the container must be cleared of the dummy block, die, and the butt of the billet remaining after extrusion, this clearing of the container after each extrusion and the subsequent loading of the container wtih the die, billet and dummy block consumes a substantial amount of valuable time during which extrusions are not being made, with a resulting lowering of the output of the extrusion press.

It is the purpose of this invention to provide a system by means of which a single extrusion press can successively extrude billets many times faster than the present rate at which extrusion can be effected. This is achieved in the present invention by providing a system in which a plurality of containers are loaded and then successively fed to and held at the extrusion station of an extrusion press. The billets are extruded, the containers are removed and the contents cleared, and then the containers are reloaded and recycled back to the extrusion station. The system permits all the loading and clearing of the containers to be completed out of the extrusion press, so that the press is clear for extruding as fast as loaded containers can be charged into the extrusion press.

Broadly stated, the system is for successively extruding billets through an extrusion press and it comprises an extrusion press including a ram and an extrusion station at which the ram extrudes the billet, and a plurality of containers each of which define a billet chamber therein into which a billet is loaded. Conveyor means are provided for successively charging loaded containers to the extrusion station. A housing in the press is configured successively to receive the containers and to hold them at the extrusion station during extrusion and to release them after extrusion of the billet contained therein. A loading station is also provided at which the billet is loaded in the container prior to conveyance to the extrusion station and an ejector station is provided at which the butt end of the billet is cleared from the container after extrusion. Means are also provided for conveying the container about the system.

The method is for extruding a billet through a die from a billet chamber by means of an extrusion press wherein a billet positioned within a billet chamber defined by a container is extruded by an extrusion ram. The improvement in this method is characterized by loading a plurality of containers with billets and successively conveying each container to the extrusion station of the extrusion press. The billet is extruded through the die within each container as it is held in the extrusion station. After extrusion of the billet the containers are removed from the extrusion press and the butt of the billet is ejected from the removed container.

By means of the system of the invention containers loaded with billets can be successively charged into an extrusion press and extruded almost as quickly as the ram can be brought forward to its extrusion position and retracted to permit removal of the container. All the loading and clearing operations of the die are conveniently carried out at stations away from the extrusion press and thus a loaded container can always be ready to be charged into the extrusion press as soon as one extrusion cycle has taken place.

A preferred embodiment of this invention is described hereinbelow with reference to the drawings wherein.

Figure 1:
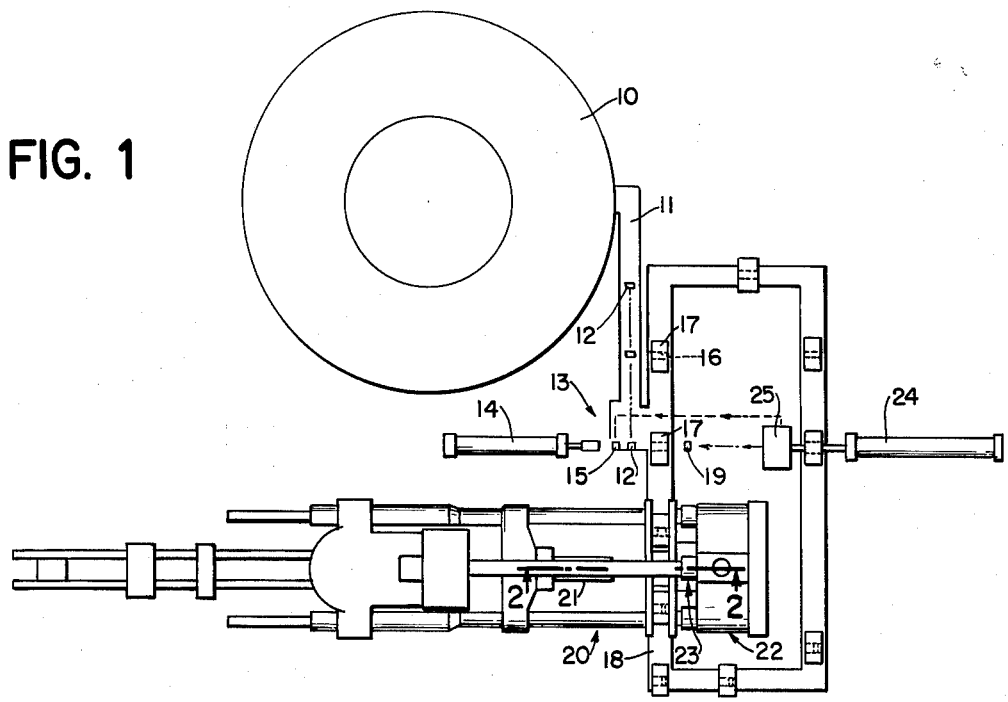
FIG. 1 is a plan view, partly schematic, of the extrusion system.

The system is shown in FIG. 1 and it basically consists of a furnace 10 which is used to heat the billets to the desired temperature. A furnace outlet conveyor 11 conveys billets 12 from the furnace to a loading station 13. At the loading station 13 a billet and dummy loader 14 consisting essentially of a hydraulic ramrod is positioned to drive a dummy block 15 and a billet 12 into a billet chamber 16 which is defined in each of containers 17. The containers 17 are positioned on a continuous conveyor 18 which extends about the entire system so as to transfer the conveyors to the respective stations of the system. Thus, by "closed conveyor means" as used herein is meant a conveyor arrangement by which the containers can be transferred from the extrusion apparatus to each of the respective stations and recycled back to the extrusion apparatus when reloaded. At the loading station 13, a die 19 is inserted into the billet chamber at the end opposite to that in which the billet and dummy block were inserted.

Once loaded, the loaded container 17 is conveyed to an extrusion press 20. The extrusion press 20 basically consists of a hydraulically driven ram 21 and a housing 22 in which the container is received, and includes a platen to compensate for the force of the extrusion ram. The container 17 is conveyed laterally relative to the direction of the extrusion ram and is charged into the housing 22 which is configured to receive the container and the conveyor. Once the loaded container 17 is properly positioned at the extrusion station 23 of the extrusion press, the ram is brought forward and the billet is extruded out through the die. The extruded member is cut from the remaining butt of the billet by means of a shear die, leaving the dummy block, the butt of the billet, and the die in the container 17. The container 17 is then removed from the housing 22 on the continuous conveyor 18 and is transferred around the extrusion press and back to an ejection station at which ejector press 24 is located, which has a rod that is hydraulically inserted into the removed container so as to force out the die, butt and dummy block. The die, dummy block, and butt are then inserted into a butt shear 25 where they are separated. The dummy block is conveyed to the loader 14 to be reused as is the die 19 and the butt is discarded as scrap.

As shown in FIG. 1 as soon as one container 17 has been removed from the extrusion press 21 a second container which has already been loaded at the station 13 is moved to the extrusion press and is charged into the extrusion press and held at the extrusion station. This operation is repeated so that successive extrusions can be made with a single extrusion press.

Figure 2:
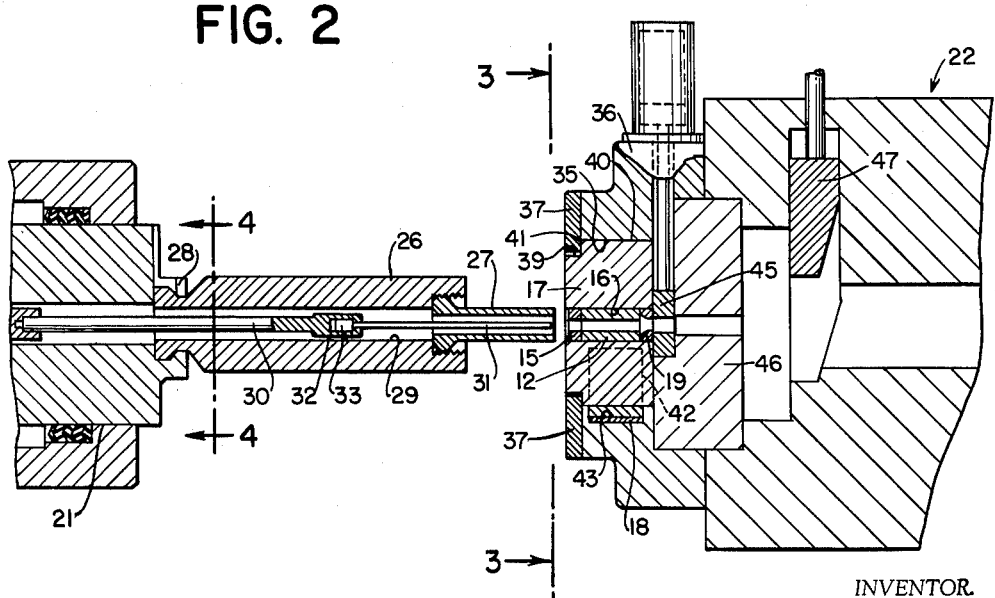
FIG. 2 is a side sectional elevation of the extrusion press taken along the lines 2—2 of FIG. 1.

As shown in FIG. 2 some modifications had been made from extrusion apparatus normally used. The extrusion ram 21 has a two-piece stem consisting of a base end 26 and a working end 27. It is to be noted that the working end 27 of the stem is threaded into the base end 26 of the stem and the working end is only long enough to pass through the container so as to preserve short column strength.

Figure 4:
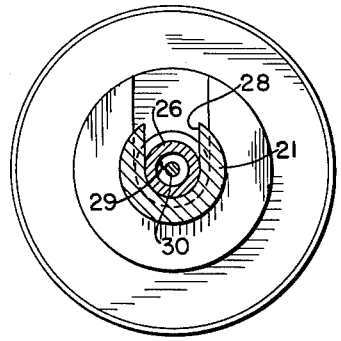
FIG. 4 is a section of the extrusion ram taken along lines 4—4 of FIG. 2.

As shown in FIG. 4 the base end 26 has a slot 28 extending through the top portion thereof. The ram 21 has a bore 29 extending through it and into the stem. Positioned within the bore is a mandrel 30 and a mandrel holder 31. The mandrel 30 is provided in this embodiment because the billets used are hollow billets and during extrusion the mandrel will be positioned within the die so that tubular members can be extruded from the hollow billets. The mandrel holder 30 has a clevice 32 formed at its forward end and the mandrel is simply mounted in the mandrel holder 31 by threading the mandrel 31 into a nut 33 at its rearmost end and dropping the nut into the clevice. The slot 28 is provided in the base end 26 of the stem so that the mandrel can be simply lifted out of the stem and a new one inserted by dropping it through the slot. This simple construction permits the mandrel to be changed between each extrusion if this is found to be necessary.

Figure 3:
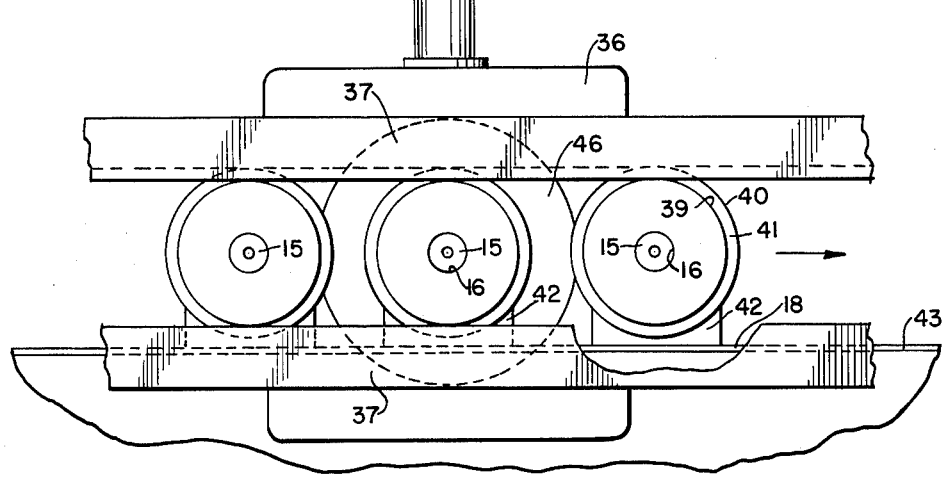
FIG. 3 is a side elevation taken along the lines 3—3 of FIG. 2.

As shown in FIG. 2 the housing 22 has a laterally extending slot 35 in the forward housing 36. Gibs 37 extend from the face of the housing and define a reduction in the size of the slot 35 at this point. The slot thereby has a cross section which substantially matches the cross sectional configuration of the container 17. As shown in FIG. 2 and FIG. 3 the container 17 is a substantially annular member with a stepped outer diameter. The smallest outer diameter 39 is located at the front of the container and the larger outer diameter 40, at the base of the container. This stepped outer configuration defines a shoulder 41 therebetween which is of such a size that it will be positioned adjacent the gibs 37 and thereby retained in the housing during insertion and retraction of the ram.

The slot 35 does not exactly conform to the cross section configuration of the containers 17. As can be seen in FIG. 3 the containers are mounted on skids 42 which ride on the conveyor 18. Therefore to permit the containers to be fed into the housing 36 a bottom slot 43 is provided in the housing so as to allow the conveyor 18 and the skid 42 to pass through the housing and to support the container in proper alignment at the extrusion station. Once the container 17 is positioned within the housing, the die 19 abuts against a standard lock plate 45 which is positioned within a fixed container 46. After extrusion is completed, a standard shear die 47 is provided to shear off the extruded member and leave the butt positioned within the removable container.

I claim:

1. A system for successively extruding billets through an extrusion press comprising:
   (a) an extrusion press including a ram and an extrusion station at which said ram extrudes said billet,
   (b) a plurality of containers, each of which define a billet chamber therein into which a billet is loaded,
   (c) closed conveyor means for successively charging said containers to said extrusion station and conveying them to each station in the system,
   (d) a loading station along said conveyor means at which said billets are loaded into said containers prior to conveyance to the extrusion station,
   (e) a housing in the press configured successively to receive said containers and to hold them at the extrusion station during extrusion and to release them after extrusion of the billet contained therein, and
   (f) an ejector station along said conveyor means at which the butt end of the billet is cleared from the container after extrusion.

2. A system for successively extruding billets through an extrusion press comprising:
   (a) an extrusion press including a ram and an extrusion station at which said ram extrudes said billet,
   (b) a plurality of containers, each of which define a billet chamber therein into which a billet is loaded,
   (c) closed conveyor means for successively charging said containers to said extrusion station and conveying them to each station in the system,
   (d) a loading station along said conveyor means at which said billets are loaded into said container prior to conveyance to the extrusion station,
   (e) a housing in the press configured successively to receive said containers as they are conveyed laterally into the housing relative to the direction of said extrusion ram, with gibs in the housing to hold the container at the extrusion station and to release it laterally after extrusion, and
   (f) an ejector station along said conveyor means at which the butt end of the billet is cleared from the container after extrusion.

3. A system for successively extruding billets through an extrusion press comprising:
   (a) an extrusion press including a ram and an extrusion station at which said ram extrudes said billet, and a mandrel operatively connected to said ram for insertion within said die during extrusion,
   (b) a plurality of containers, each of which define a billet chamber therein for receiving a die, billet and dummy,
   (c) closed conveyor means for successively charging said containers to said extrusion station and conveying them to each station in the system,
   (d) a loading station along said conveyor means at which said die, billet, and dummy are loaded into said container pior to conveyance to the extrusion station,
   (e) a housing in the press configured to receive a container and to hold it at said extrusion station during extrusion and to release it after extrusion,
   (f) a releasable mandrel mount within said ram for properly positioning said mandrel and for permitting easy replacement thereof,
   (g) access means into the ram through which a mandrel can be removed and inserted, and
   (h) an ejector station along said conveyor means at which the billet chamber is cleared of the dummy and die after extrusion.

4. A system for successively extruding billets through an extrusion press comprising:
   (a) an extrusion press including a ram and an extrusion station at which said ram extrudes said billet,
   (b) a plurality of containers, each of which define a billet chamber therein into which a billet is loaded,
   (c) closed conveyor means for successively charging said containers to said extrusion station and conveying them to each station in the system,
   (d) a loading station along said conveyor means at which said die, billet and dummy are loaded into said container prior to conveyance to the extrusion station,
   (e) a housing in the press configured successively to receive said containers as they are conveyed laterally into the housing relative to the direction of travel of said extrusion ram and to release them after extrusion of the billet contained therein,
(f) a furnace adjacent the loading station for heating the billets prior to loading, and
(g) an ejector station along said conveyor means at which said dummy and die are cleared from the container after extrusion.

5. A system for successively extruding billets through an extrusion press comprising:
(a) an extrusion press including a ram and an extrusion station at which said ram extrudes said billet, and a mandrel operatively connected to said ram for insertion within said die during extrusion,
(b) a plurality of containers, each of which define a billet chamber therein for receiving a die, billet and dummy,
(c) continuous conveyor means positioned to charge said containers laterally into the extrusion press relative to the direction of said extrusion ram and to convey them to each station in the system,
(d) a loading station along the conveyor means at which said die, billet and dummy are loaded into said container prior to conveyance to the extrusion station,
(e) a housing in the press configured to permit the conveyor means to pass laterally therethrough and to receive a container and hold it at said extrusion station during extrusion and to release it after extrusion,
(f) a releasable mandrel mount within said ram for properly positioning said mandrel and for permitting easy replacement thereof,
(g) access means opening into the ram through which a mandrel can be removed and inserted,
(h) a furnace adjacent the loading station for heating the billets prior to loading, and
(i) an ejector station along the conveyor means at which said dummy and die are cleared from the container after extrusion.

References Cited by the Examiner

UNITED STATES PATENTS

| 2,880,867 | 4/1959 | Keck | 207—1.1 |
| 2,908,385 | 10/1959 | Walker | 207—1.1 |
| 2,954,121 | 9/1960 | Benson | 207—1.2 |
| 3,120,304 | 2/1964 | Pahnke et al. | 207—1 |
| 3,123,215 | 3/1964 | Zilges et al. | 207—19 |

FOREIGN PATENTS 804,220  11/1958  Great Britain.

CHARLES W. LANHAM, *Primary Examiner.*

E. D. O'CONNOR, H. D. HOINKES,
*Assistant Examiners.*